ADJUSTABLE PRESSURE CONTACT SEMICONDUCTOR DEVICES
Filed Aug. 22, 1967
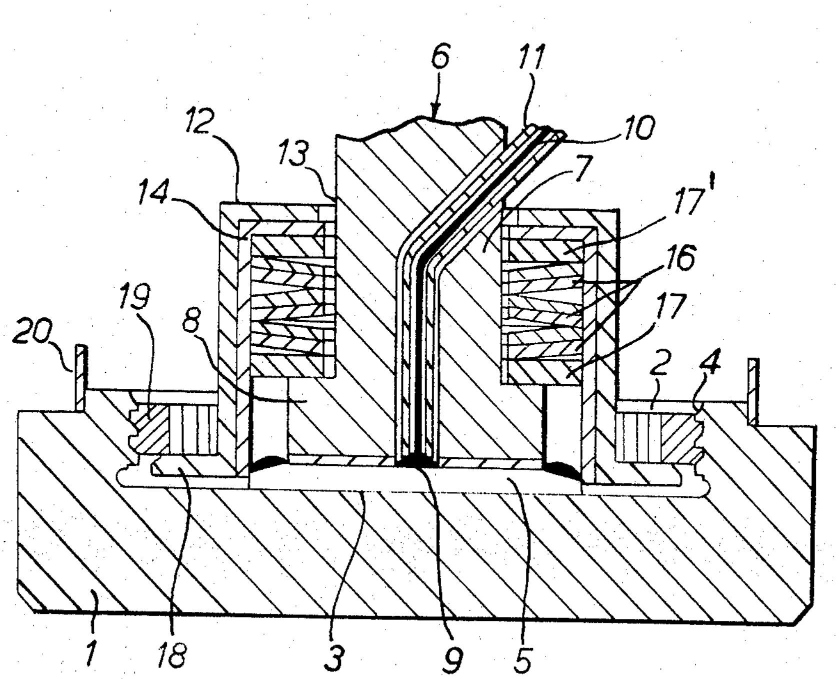

United States Patent Office 3,480,844
Patented Nov. 25, 1969

3,480,844

ADJUSTABLE PRESSURE CONTACT SEMI-CONDUCTOR DEVICES

Colin Bright Lewis, Nettleham, England, assignor to Associated Electrical Industries Limited, London, England, a British company Filed Aug. 22, 1967, Ser. No. 662,518
Claims priority, application Great Britain, Nov. 4, 1966, 49,576/66
Int. Cl. H01l 3/00, 5/00, 11/00
U.S. Cl. 317—234 6 Claims

ABSTRACT OF THE DISCLOSURE

Semiconductor device in which a semiconductor element having a pair of surface electrodes is held solely by clamping pressure between a pair of conductive members and the element is located in an enclosure formed in part by a conductive base member and in part by a metal cap which is attached to the base member. Spring means are provided to produce the clamping pressure and the spring means act between an elongate conductive member and a part of the metal cap. The cap is attached to the base member in such a way which permits the pressure exerted on the element by the spring means to be adjusted without causing rotation of the cap and therefore of the elongate conductive member.

BACKGROUND OF THE INVENTION

This invention relates to semiconductor devices in which an element comprising a wafer of semiconductor material having at least one junction therein between regions of the wafer of different conductivity or conductivity type and a pair of surface electrodes one on each of the opposite faces of the wafer is held solely by spring pressure between a pair of conductive members with the electrodes on the element in electrical contact with the respective members.

DESCRIPTION OF THE PRIOR ART

It is known in such devices for a conductive base member which forms part of the housing of the device to constitute one of the conductive members and for the other conductive member to be of elongate form. In order to clamp the element between the two conductive members the spring means must act between the elongate conductive member and a fixed part of the device. It is known for the fixed part to be a part of a metal cap which is rigidly secured to the base member.

It is desirable that the pressure exerted on the semiconductor element be within a close range of values and to enable a pressure within this range to be set up it is desirable that the pressure exerted on the element by the spring means be variable so that during manufacture of the device the most suitable pressure on the element can be set up.

SUMMARY OF THE INVENTION

According to the present invention a semiconductor device comprises a conductive base member having a flat support surface, a metal cap which forms an enclosure with said base member, an elongate conductive member extending into the enclosure through an aperture in the cap, a semiconductor element in said enclosure clamped between, and with a pair of surface electrodes on the element in contact with, the support surface and an end face of the conductive member respectively by spring means acting between the elongate member and an electrically insulating inner lining of part of said cap and wherein said cap is attached to said base member by means which permit limited movement of said part of the cap towards and away from said surface to vary the pressure exerted on said element by said spring means without causing rotation of the cap and therefore of the elongate conductive member.

It is convenient for the metal cap to be in the form of a cylinder closed at one end except for an opening through which the conductive member extends and for the open end of the cylinder to project into a recess in the base member surrounding said support surface. An outwardly turned flange at the open end of the cap is held beneath a locking ring the threaded outer edge of which engages with a thread on the outer wall defining the recess. The spring compression and hence the contact pressure between the element and the conductive members may be adjusted by varying the depth in the recess to which the locking ring is screwed.

BRIEF DESCRIPTION OF THE DRAWING

In order that the invention may be more readily understood, it will now be described as applied to a thyristor, by way of example, with reference to the accompanying drawing which shows a sectional side elevation of part of a thyristor.

DESCRIPTION OF THE PREFEREED EMBODIMENT

A generally cylindrical metal body 1 of low electrical and thermal resistance such as copper or aluminium has a recess 2 in one face thereof and the lower face of the recess provides a flat support surface 3. The outer wall defining the recess is at right angles to the support surface 3 and is threaded as indicated by reference numeral 4. A semiconductor thyristor element 5 is supported on the element 3.

The element 5 which is not illustrated in detail, comprises a wafer of semiconductor material having a p-n-p-n structure with a pair of surface electrodes one on each of the opposite faces of the wafer. The electrode which serves as the emitter is of annular form and has a washer of a metal having a similar expansion coefficient as that of the semiconductor material, such as molybdenum in contact therewith. An annular foil of a noble metal may with advantage be located between the emitter electrode and the washer. The surface electrode on the opposite face of the washer to the emitter electrode extends over substantially all of that face and a plate of a metal having a similar expansion coefficient as that of the semiconductor material is in contact therewith.

The element 5 is supported on the support surface 3 with the metal plate separated from the surface by a foil of a noble metal and thus the surface electrode on the opposite face of the washer to the emitter electrode is in electrical contact with the metal body. A conductive member 6 has an elongate stem 7 and an enlarged head portion 8 at one end thereof. The head portion and at least a part of the stem adjacent the head portion have a central bore and the end face of the enlarged head portion which is of annular form engages with the annular washer of the element. The conductive member 6 is thus in electrical contact with the emitter electrode of the element. The annular emitter electrode surrounds a central trigger electrode 9 on the element and an electrical conductor 10 in contact with the trigger electrode projects through the bore in the member 6 and is insulated from the member by an insulating sleeve 11.

A metal cap 12 is attached to the body 1 so that with the flat support surface 3' it provides an enclosure. The cap has an aperture 13 at its upper end to permit the stem 7 of the elongate member to extend therethrough and the enlarged head portion of the elongate member and the element 5 are located within the enclosure. The inside surface of at least the upper part of the cap is provided with a lining 14 of electrically insulating material and the lining may be in the form of a layer supported on the inner surface of the cap or it may be in the form of a sleeve which is separate from the cap. When the lining adheres to the cap it may be in the form of a ceramic which is flame sprayed on to the cap. The purpose of the lining is to insulate the element and the elongate member and all metal parts in contact therewith from the cap.

The element 5 is clamped between the enlarged head portion 8 of the member 6 and the support surface 3' solely by spring means which urge the member 6 towards the support surface. The spring means take the form of a plurality of Belleville washers 16 which are fitted on to the part of the elongate stem 7 of the member which is within the enclosure. A plain washer 17 is interposed between the stack of Belleville washers and the enlarged head portion 8 and a further plain washer 17' is interposed between the stack of Belleville washers and the lining 14 of the cap. The washers serve to locate the member 6 centrally of the cap and they act between the enlarged head portion of the member and the lining in the cap to urge the member 6 towards the support surface. The pressure exerted by the washers on the element is adjustable since the top end of the cap 12 is movable towards and away from the flat surface 3' to vary the compression of the washers. The open end of the cap has an outwardly extending flange 18 which is located in the recess 2 beneath a locking ring 19. The ring is provided on its outer edge with a thread which mates with the thread 4 on the wall defining the recess. By rotating the locking ring the pressure exerted by the washers on the element is varied.

The body 1 forms a conductive bass member of a housing and the remaining part of the housing is hermetically sealed to a metal ring 20 which is brazed to the body 1 and surrounds the recess in the body. The housing includes an electrically insulating part and a conductive part neither of which are shown and the latter part is sealed to the member 6 where the member extends through an opening in the housing. In practice the ring 20 is brazed to the body 1 and then the recess 2 is cut in the base member. The advantage of this arrangement is that after the brazing operation the support surface 3 and the opposite face of the body may be skimmed flat and by cutting the thread after the brazing operation maximum thread strength is obtained and also it ensures that the thread and the skimmed surfaces are at right angles.

The main advantage which is gained by attaching the cap to the base member by means of a threaded locking ring is that when the locking ring is rotated to vary the pressure exerted by the spring means, the cap, lining and the spring means do not rotate and there is no danger of the elongate support member rotating relative to the element and causing damage to the surface electrodes of the element.

When the device is a diode the element is a p-n structure and the member 6 need not have a part of tubular form since the trigger electrode 9 and the electrical connection thereto are not provided.

I claim:

1. A semiconductor device comprising a conductive base member providing a flat support surface; a metal cap forming an enclosure with said base member; an electrically insulating inner lining on part of said cap; an elongate conductive member extending into the enclosure through an aperture in the cap; spring means acting between the elongate member and said electrically insulating lining to urge an end face of the conductive member towards said support surface; a semiconductor element in said enclosure clamped between and with a pair of surface electrodes on the element in contact with the support surface and said end face of the conductive member respectively; and a locking ring for locking said cap to said base member, said locking ring being rotatable with respect to said cap and said base member to move the cap towards and away from said surface to vary the pressure exerted on said element by said spring means.

2. A semiconductor device as claimed in claim 1, in which said cap has an outwardly extending flange held beneath the locking ring, said locking ring being in threaded engagement with the said base member.

3. A semiconductor device as claimed in claim 2, in which said flange is positioned at an open end of the cap and located in a recess in said base member and the locking ring is in threaded engagement with a wall defining the said recess.

4. A semiconductor device as claimed in claim 1, in which said spring means comprises a stack of a plurality of spring washers surrounding said elongate member and locating the elongate member centrally of said cap.

5. A semiconductor device comprising a conductive base member having a recess in one face thereof with the base of the recess providing a flat support surface; a metal cap forming an enclosure with said base member; a layer of electrically insulating material supported on the inner surface of the cap; an elongate conductive member extending into the enclosure through an aperture in the cap; a stack of a plurality of spring washers surrounding said elongate conductive member and acting between the electrically insulating material in the cap and said conductive member to urge an end face of an enlarged end portion of said elongate member towards said support surface; a semiconductor element in said enclosure clamped between and with a pair of surface electrodes on the element in contact with the support surface and said end face respectively; a locking ring in threaded engagement with a wall defining the recess; and an outwardly extending flange at an open end of said cap located in the recess and held beneath the locking ring, said locking ring being rotatable with respect to said cap and said base member to move said cap towards and away from said surface to vary the pressure exerted on said element by said spring washers.

6. A semiconductor device comprising a conductive base member having a recess in one face thereof with the base of the recess providing a flat support surface and with a wall defining the recess arranged at right angles to said surface; a metal cap forming an enclosure with said base member; an electrically insulating inner lining on part of said cap; an elongate conductive member extending into the enclosure through an aperture in the cap with said conductive member having an enlarged end portion, said end portion providing an annular end face; a stack of a plurality of spring washers surrounding said elongate conductive member and acting between the electrically insulating material in the cap and said enlarged end portion of the conductive member to urge said annular end face towards said support surface; a semiconductor p-n-p-n element supported on said support surface with an electrode of the element in electrical contact with said surface and an annular emitter contact of the element in electrical contact with the annular end face of said conductive member; a locking ring in threaded engagement with the wall defining the recess; and an outwardly extending flange at an open end of said cap, said flange being located in said recess and being held beneath the locking ring and said locking ring being rotatable with respect to said cap and said base member to move said cap towards and away from said surface to vary the pressure exerted on said element by said spring washers.

References Cited

UNITED STATES PATENTS

| | | | |
|---|---|---|---|
| 3,155,885 | 11/1964 | Marino et al. | 317—234 |
| 3,252,060 | 5/1966 | Marino et al. | 317—234 |
| 3,293,510 | 12/1966 | Pfaffenberger et al. | 317—235 |
| 3,296,506 | 1/1967 | Steinmetz et al. | 317—234 |
| 3,337,781 | 8/1967 | Ferree | 317—234 |

JOHN W. HUCKERT, Primary Examiner

R. F. POLKSACK, Assistant Examiner

U.S. Cl. X.R.

317—235